(12) United States Patent
Horie

(10) Patent No.: US 10,577,134 B2
(45) Date of Patent: Mar. 3, 2020

(54) SEPARATION DEVICE

(71) Applicant: KAWASAKI JUKOGYO KABUSHIKI KAISHA, Kobe-shi, Hyogo (JP)

(72) Inventor: Yoichi Horie, Mino (JP)

(73) Assignee: KAWASAKI JUKOGYO KABUSHIKI KAISHA, Kobe-shi (JP)

(*) Notice: Subject to any disclaimer, the term of this patent is extended or adjusted under 35 U.S.C. 154(b) by 245 days.

(21) Appl. No.: 15/539,802

(22) PCT Filed: Dec. 24, 2015

(86) PCT No.: PCT/JP2015/006438
§ 371 (c)(1),
(2) Date: Jun. 26, 2017

(87) PCT Pub. No.: WO2016/103705
PCT Pub. Date: Jun. 30, 2016

(65) Prior Publication Data
US 2017/0349303 A1   Dec. 7, 2017

(30) Foreign Application Priority Data

Dec. 26, 2014 (JP) .................................. 2014-265801

(51) Int. Cl.
*B64G 1/64* (2006.01)
*F42B 15/36* (2006.01)
(Continued)

(52) U.S. Cl.
CPC .............. *B64G 1/645* (2013.01); *B64G 1/64* (2013.01); *E05B 17/0062* (2013.01);
(Continued)

(58) Field of Classification Search
CPC . B64G 1/645; Y10T 403/11; Y10T 292/0814; Y10T 292/0818;
(Continued)

(56) References Cited

U.S. PATENT DOCUMENTS 4,426,053 A * 1/1984 Chenin .................. B64G 1/222
    136/245
4,540,873 A * 9/1985 Kester .................... B64G 1/222
    219/200
(Continued)

FOREIGN PATENT DOCUMENTS

CN      101665156 A  *  3/2010
CN      102788537 A  *  11/2012
(Continued)

*Primary Examiner* — Joseph W Sanderson
(74) *Attorney, Agent, or Firm* — Oliff PLC

(57) ABSTRACT

A separation device includes: an outer case; a pillar-shaped separation member including an engaging portion; a support member including a swinging portion and an engageable portion, the swinging portion being swingably supported by the outer case, the engageable portion supporting the separation member; an inner case including a fitting hole restricting swinging of the support member; and an operation-enabling element, which supports the inner case and which is fusion-cut when an electric current is applied thereto. When the operation-enabling element is fusion-cut, the inner case is displaced, such that: the engageable portion of the support member detaches from the fitting hole; the swinging portion swings; and the engageable portion moves away from the engaging portion to release the separation member.

9 Claims, 12 Drawing Sheets

(51) Int. Cl.
*E05B 17/00* (2006.01)
*B64G 1/22* (2006.01)

(52) U.S. Cl.
CPC .............. *F42B 15/36* (2013.01); *B64G 1/222* (2013.01); *B64G 1/641* (2013.01)

(58) Field of Classification Search
CPC ......... Y10T 292/0822; Y10T 292/0876; Y10T 292/0877; Y10T 292/0883; Y10T 292/68; Y10T 292/696; Y10T 292/699; Y10T 292/702; E05B 17/0054; E05B 17/0062; E05C 19/02; E05C 19/026
See application file for complete search history.

(56) References Cited

U.S. PATENT DOCUMENTS

| | | | |
|---|---|---|---|
| 4,682,804 A * | 7/1987 | Palmer | B64G 1/645 244/137.4 |
| 5,123,794 A | 6/1992 | Pire | |
| 6,311,930 B1 * | 11/2001 | Hersh | B64G 1/222 244/172.9 |
| 6,352,397 B1 * | 3/2002 | O'Quinn | B64G 1/645 411/270 |
| 6,450,725 B1 * | 9/2002 | Roth | B64G 1/222 294/86.4 |
| 6,525,920 B2 * | 2/2003 | Rudoy | B64G 1/222 361/160 |
| 6,530,718 B2 * | 3/2003 | Nygren | F16B 5/0208 403/337 |
| 6,769,830 B1 * | 8/2004 | Nygren | B64G 1/641 29/446 |
| 8,021,069 B2 * | 9/2011 | Baghdasarian | B64G 1/645 337/401 |
| 8,568,053 B2 * | 10/2013 | Baghdasarian | B64G 1/222 403/2 |
| 8,702,134 B2 * | 4/2014 | Lesjak | E05B 63/128 292/340 |
| 9,206,859 B2 * | 12/2015 | Descubes | F04D 13/021 |
| 9,604,738 B2 * | 3/2017 | Laughlin | B64G 1/222 |
| 10,266,284 B2 * | 4/2019 | Coffey | B64G 1/40 |
| 2011/0291427 A1 * | 12/2011 | Lesjak | E05B 63/128 292/228 |
| 2015/0050078 A1 * | 2/2015 | Laughlin | B64G 1/222 403/327 |
| 2015/0115106 A1 * | 4/2015 | Coffey | B64G 1/40 244/158.2 |

FOREIGN PATENT DOCUMENTS

| | | |
|---|---|---|
| EP | 0454564 B1 | 3/1994 |
| GB | 1245969 A | 9/1971 |
| JP | 4304137 B2 | 7/2009 |
| JP | 4537888 B2 | 9/2010 |
| JP | 2014-019434 A | 2/2014 |

* cited by examiner

SEPARATION DEVICE

TECHNICAL FIELD

The present invention relates to a separation device.

BACKGROUND ART

A rocket that is launched with a cosmonautic vehicle such as an artificial satellite is provided with a separation device for fixing the cosmonautic vehicle to the rocket and separating the cosmonautic vehicle from the rocket. The separation device is required to separate the cosmonautic vehicle at a suitable timing. Various structures have been adopted to satisfy the requirement (see Patent Literatures 1 to 3, for example).

CITATION LIST

Patent Literature

PTL 1: Japanese Patent No. 4304137
PTL 2: Japanese Patent No. 4537888
PTL 3: Japanese Laid-Open Patent Application Publication No. 2014-19434

SUMMARY OF INVENTION

Technical Problem

The inventor of the present invention has arrived at a separation device with a novel structure, which is different from other separation devices, such as one disclosed in Patent Literature 1. An object of the present invention is to provide a separation device with a novel structure.

Solution to Problem

A separation device according to the present invention includes: an outer case; a pillar-shaped separation member accommodated in the outer case and including an engaging portion protruding or recessed in a radial direction, the separation member receiving a load exerted in a central axis direction; a support member including a swinging portion and an engageable portion, the swinging portion being swingably supported by the outer case, the engageable portion contacting the engaging portion to support the separation member; an inner case including a fitting hole in which the engageable portion is fitted, the fitting hole restricting swinging of the support member; and an operation-enabling element that supports the inner case in the outer case and that is fusion-cut when an electric current is applied thereto. The separation device is configured such that, when the operation-enabling element is fusion-cut, the inner case is displaced in the central axis direction, such that: the engageable portion of the support member detaches from the fitting hole; the swinging portion swings; and the engageable portion moves away from the engaging portion to release the separation member.

This makes it possible to: retain and release the separation member with a simple configuration; increase the ease of manufacturing of the separation device; and lower the manufacturing cost.

The load of an artificial satellite or the like fixed to the separation member is transmitted to retaining portions the case, but not to the operation-enabling element. Therefore, the strength of the operation-enabling element can be reduced, which makes it possible to reduce the amount of electric power necessary for fusion-cutting the operation-enabling element.

Advantageous Effects of Invention

According to the separation device of the present invention, the separation member can be fixed and released with a simple configuration. This makes it possible to readily manufacture the separation device and lower the manufacturing cost.

DESCRIPTION OF EMBODIMENTS

Figure 1:
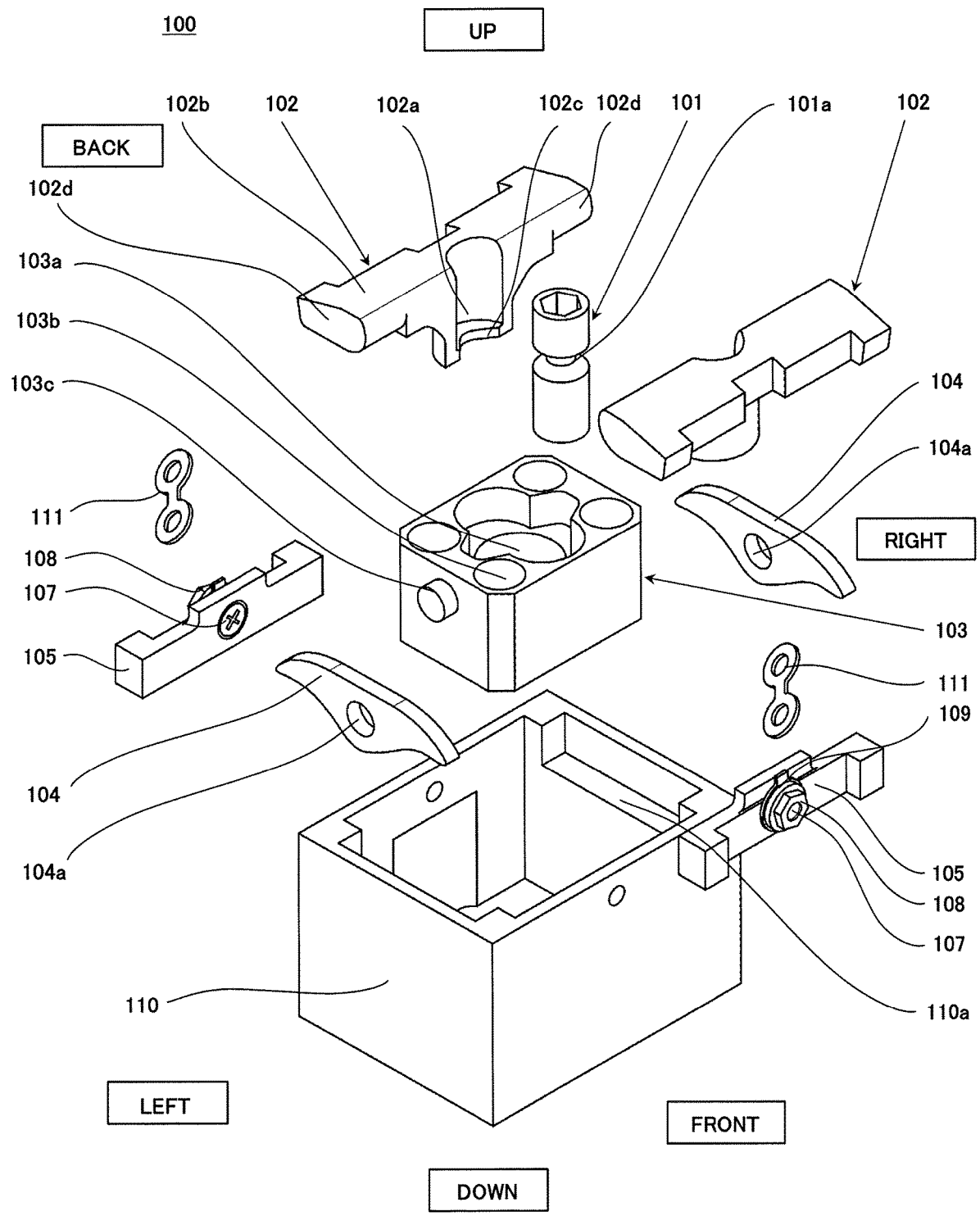
FIG. 1 is an exploded view showing a schematic configuration of a separation device according to Embodiment 1.

Hereinafter, preferred embodiments of the present invention are described with reference to the drawings. In the drawings, the same or corresponding components are denoted by the same reference signs, and repeating the same descriptions is avoided below. In the drawings, only the components necessary for describing the present invention may be shown, and the other components may be omitted. The present invention is not limited to the embodiments described below.

Embodiment 1

A separation device according to Embodiment 1 includes: an outer case; a pillar-shaped separation member accommodated in the outer case and including an engaging portion protruding or recessed in a radial direction, the separation member receiving a load exerted in a central axis direction; a support member including a swinging portion and an engageable portion, the swinging portion being swingably supported by the outer case, the engageable portion contacting the engaging portion to support the separation member; an inner case including a fitting hole in which the engageable portion is fitted, the fitting hole restricting swinging of the support member; and an operation-enabling element that supports the inner case in the outer case and that is fusion-cut when an electric current is applied thereto. The separation device is configured such that, when the operation-enabling element is fusion-cut, the inner case is displaced in the central axis direction, such that: the engageable portion of the support member detaches from the fitting hole; the swinging portion swings; and the engageable portion moves away from the engaging portion to release the separation member.

In the separation device according to Embodiment 1, the operation-enabling element may be made of a material having a tensile strength of 2000 to 3000 MPa and an electrical resistivity of 1 to $10 \times 10^{-6} \Omega \cdot m$. For example, a material having high strength and high electrical resistivity, such as an amorphous alloy ribbon, may be used.

In the separation device according to Embodiment 1, an elastic member may be disposed between the inner case and the support member, the elastic member pressing the inner case and the support member such that the inner case and the support member are spaced apart from each other in the central axis direction.

The separation device according to Embodiment 1 may further include a frame member disposed in a manner to surround the inner case when seen in the central axis direction. The frame member may be suspended from the outer case via a pair of the operation-enabling elements at a first position and a second position, the first and second positions being opposite to each other with the inner case positioned therebetween, and the frame member may support the inner case at a third position and a fourth position such that the inner case is swingable, the third and fourth positions being opposite to each other in a direction perpendicular to a direction in which the first and second positions are opposite to each other.

In the separation device according to Embodiment 1, the frame member may include a pair of plate-shaped first members and a pair of plate-shaped second members, which are swingably disposed on the inner case such that the first members are opposite to each other and the second members are opposite to each other. The second members may be suspended from the outer case via the operation-enabling elements. Both ends of each of the first members may be placed on the pair of respective second members.

In the separation device according to Embodiment 1, the engageable portion of the support member may include: a semi-cylindrical portion surrounding at least part of the separation member; and an arc-shaped flange portion protruding inward from an inner surface of the semi-cylindrical portion and contacting the engaging portion of the separation member. Corners formed at ends of an inner peripheral surface of the flange portion may be cut away.

In the separation device according to Embodiment 1, the operation-enabling element may include a fusion cutting portion whose cross-sectional area is less than that of other portions of the operation-enabling element.

In the separation device according to Embodiment 1, a third member having a higher thermal insulation capacity than that of the operation-enabling element may be disposed near the fusion cutting portion of the operation-enabling element. The thermal conductivity of the third member may be, for example, 0.1 to 0.4 W/m·k.

Hereinafter, one example of the separation device according to Embodiment 1 is described with reference to FIG. 1 to FIG. 10.

[Structure of Separation Device]

Figure 2:
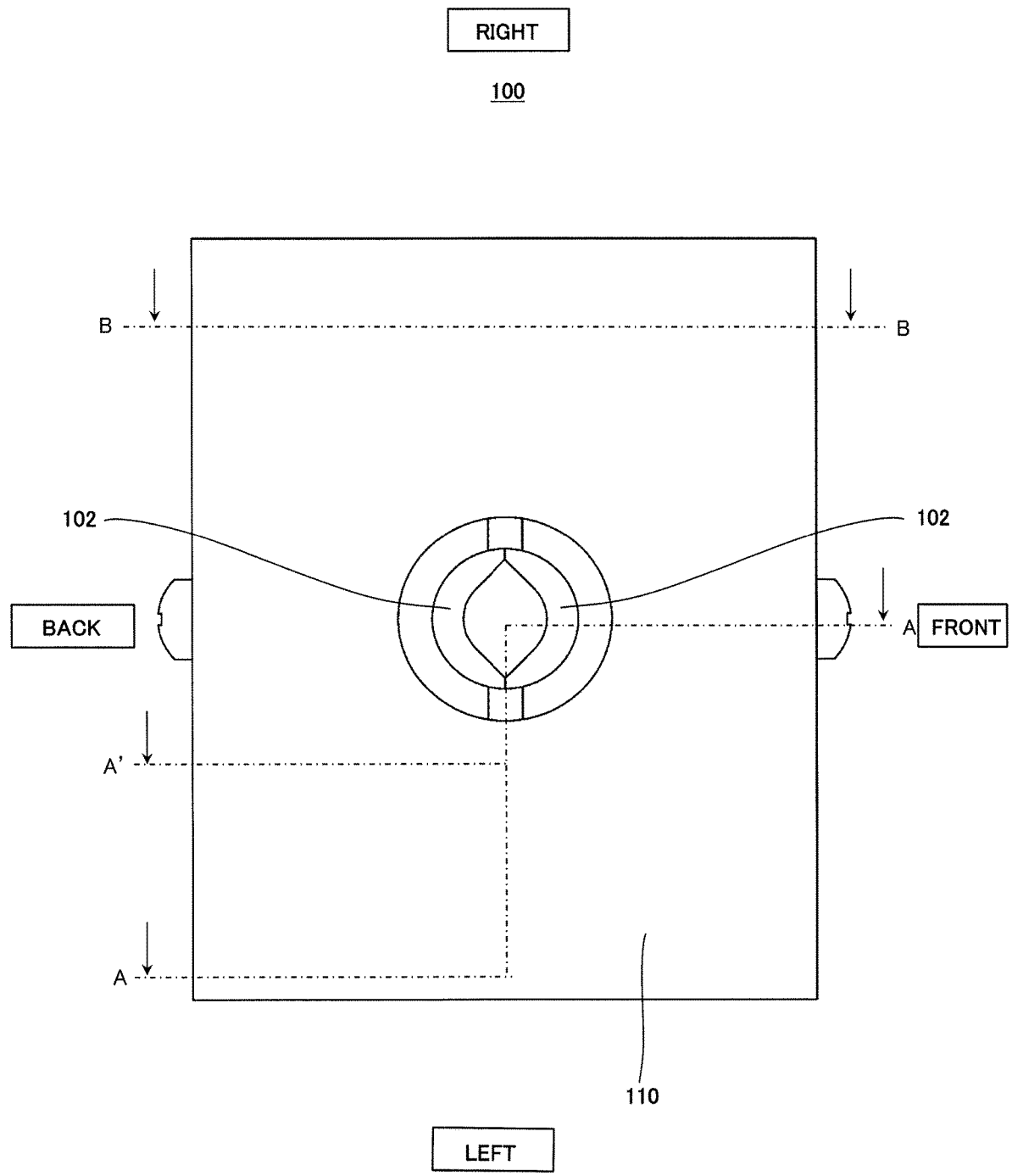
FIG. 2 is a schematic diagram showing a lower surface of the separation device of FIG. 1.
Figure 3:
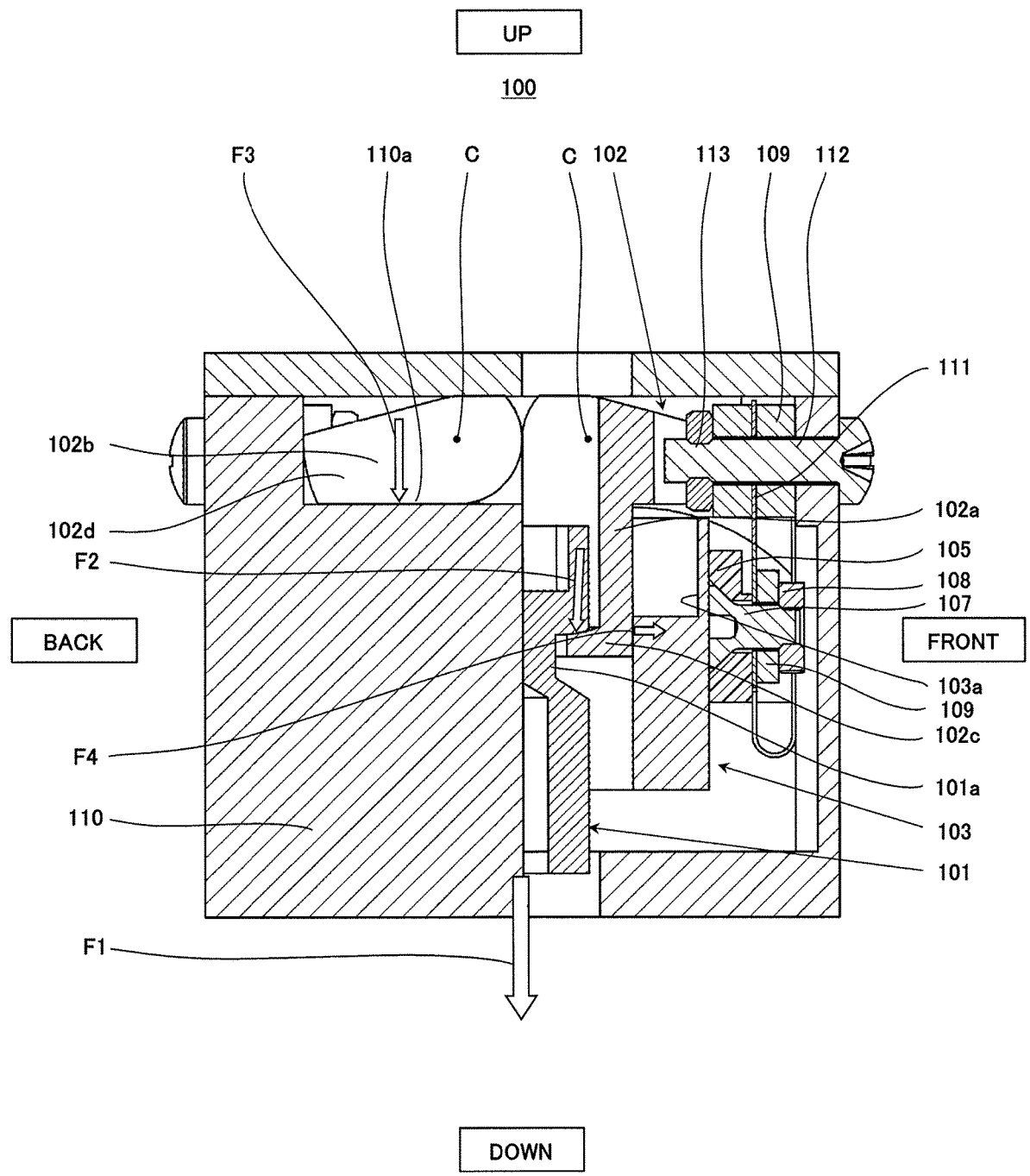
FIG. 3 is a sectional view taken along a line A-A of FIG. 2.
Figure 4:
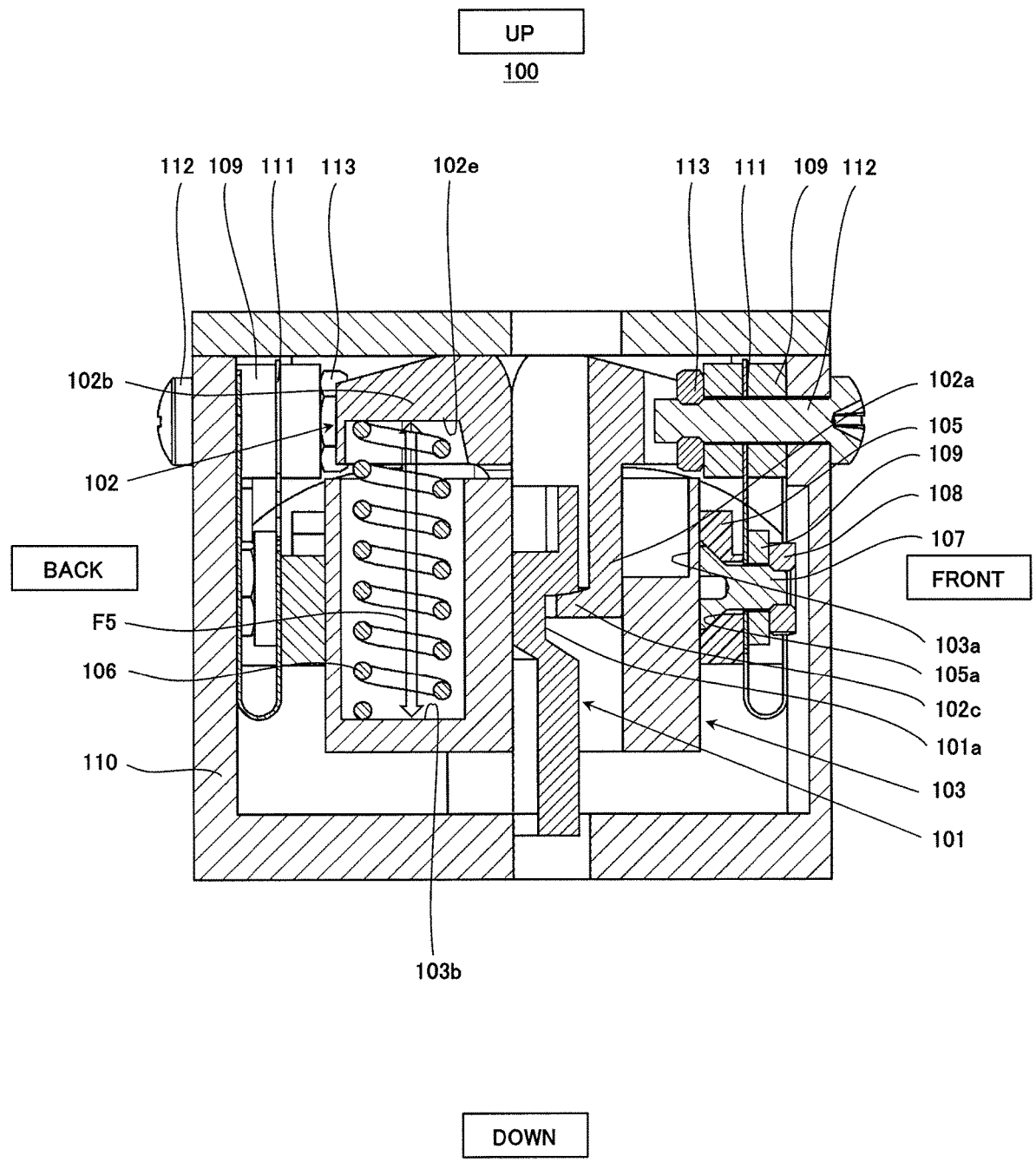
FIG. 4 is a sectional view taken along a line A-A' of FIG. 2.
Figure 5:
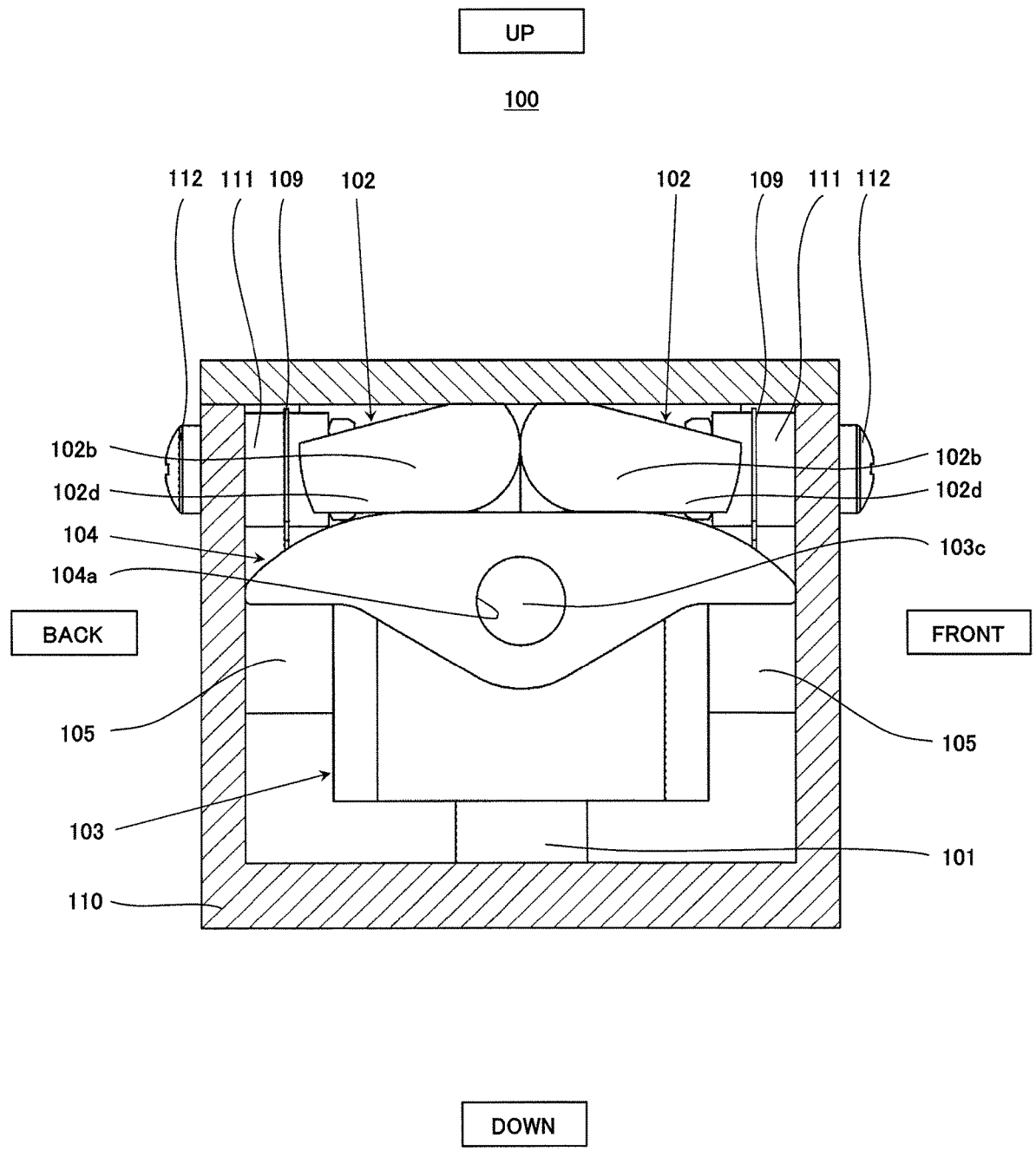
FIG. 5 is a sectional view taken along a line B-B of FIG. 2.

FIG. 1 is an exploded view showing a schematic configuration of the separation device according to Embodiment 1. FIG. 2 is a schematic diagram showing a bottom view of the separation device according to Embodiment 1. FIG. 3 is a sectional view of the separation device shown in FIG. 2, the view being taken along a line A-A of FIG. 2. FIG. 4 is a sectional view of the separation device shown in FIG. 2, the view being taken along a line A-A' of FIG. 2. FIG. 5 is a sectional view of the separation device shown in FIG. 2, the view being taken along a line B-B of FIG. 2.

It should be noted that the up-down, right-left, and front-rear directions in FIG. 1 to FIG. 5 indicate the up-down, right-left, and front-rear directions in relation to the separation device. Also, in FIG. 1, the constituent components of the separation device are partially omitted.

As shown in FIG. 1 to FIG. 5, a separation device 100 according to Embodiment 1 includes: an inner case 103, which accommodates a release rod (separation member) 101 and a pair of support members 102; operation-enabling elements 111; and a box-shaped outer case 110, which accommodates these components. The separation device 100 is configured to retain/separate a cosmonautic vehicle connected to the release rod 101.

The release rod 101 has a pillar-like shape (in this example, columnar), and is made of a metal such as stainless steel. The side surface (outer peripheral surface) of the release rod 101 is provided with an engaging portion 101a, which is recessed inward (in the radial direction) from the outer peripheral surface. The lower part of the release rod 101 is provided with a fastening portion for connecting the cosmonautic vehicle. In Embodiment 1, as the fastening portion, a hole extending in the up-down direction (central axis direction) is formed in the lower surface of the release rod 101. A thread is formed on the inner peripheral surface of the hole so that a bolt can be screwed into the hole. The cosmonautic vehicle, such as an artificial satellite, is connected to the release rod 101 via the bolt (not shown).

Although in Embodiment 1 the engaging portion 101a is formed such that it is recessed from the outer peripheral surface of the release rod 101, the engaging portion 101a is not thus limited. Alternatively, the engaging portion 101a may be formed in a manner to protrude (in the radial direction) from the outer peripheral surface of the release rod 101.

Each of the support members 102 is T-shaped, and the support members 102 are configured to retain/release the release rod 101. Specifically, the pair of support members 102 is configured to retain the release rod 101 by sandwiching the release rod 101 from its front and back, and also, release the release rod 101 by moving away from each other in the front-back direction.

Each support member 102 includes: an engageable portion 102a engaged with the engaging portion 101a of the release rod 101; and an arc-shaped swinging portion 102b configured to swing about a rotational center C (see FIG. 3). It should be noted that each support member 102 is made of a metal such as stainless steel.

Figure 6:
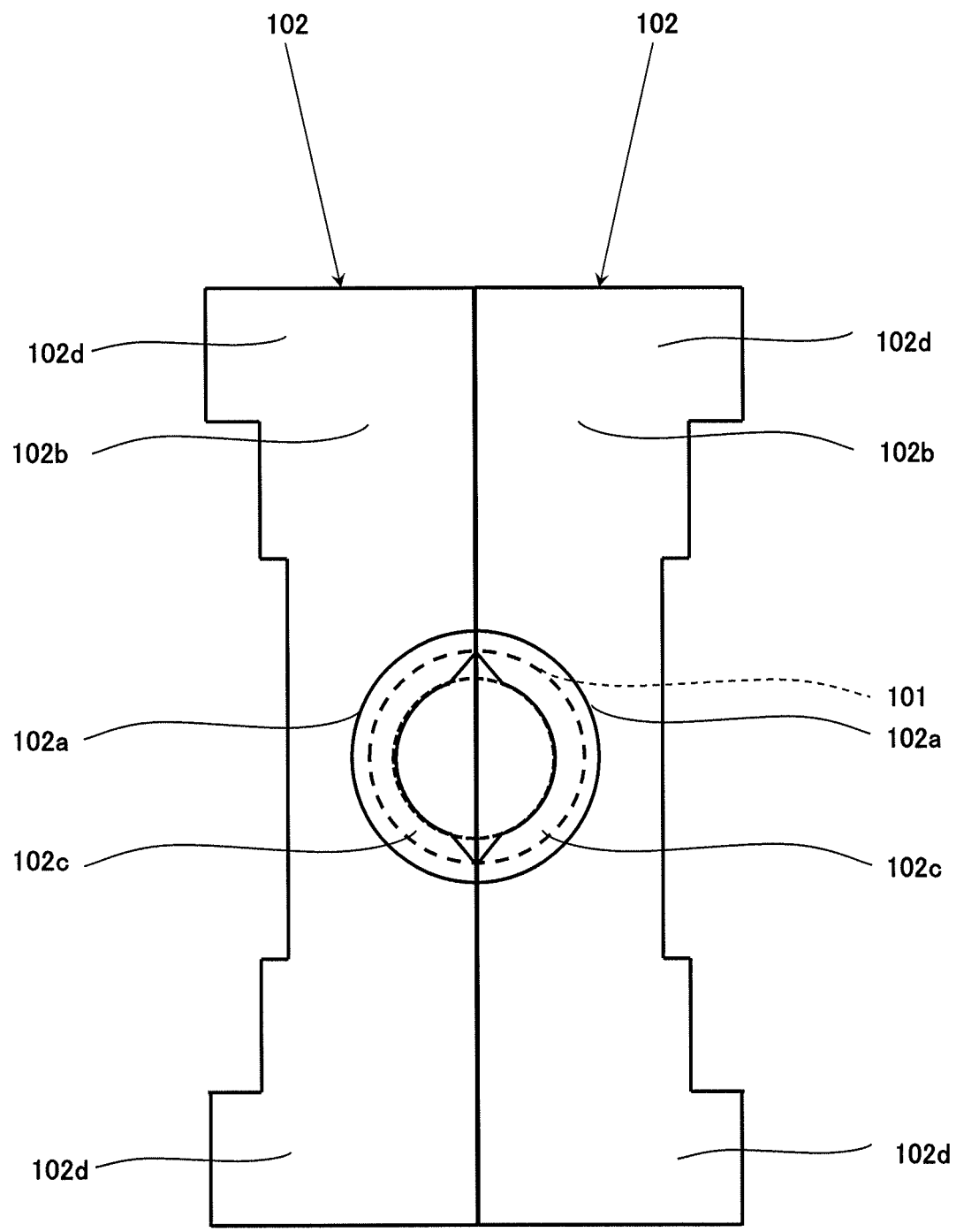
FIG. 6 is a schematic diagram showing a bottom view of support members of the separation device of FIG. 1.

Hereinafter, the configurations of the support members 102 are described in detail with reference to FIG. 1 to FIG. 6. FIG. 6 is a schematic diagram showing a bottom view of the support members 102 of the separation device of FIG. 1.

As shown in FIG. 1 to FIG. 6, the engageable portion 102a of each support member 102 includes a semi-cylindrical portion having a semi-cylindrical shape. A protruding portion (flange portion) 102c extending in the inward radial direction is formed on the lower end of the semi-cylindrical portion of the engageable portion 102a.

The protruding portion 102c is formed such that corners formed at the ends of the inner peripheral surface of the protruding portion 102c are cut (notched) away (see FIG. 2 and FIG. 6) for the purpose of reducing an operating angle of the support member 102, which is necessary for releasing the release rod 101. The releasing of the release rod 101 will be described below. It should be noted that if it is not necessary to reduce the operating angle, the cuts need not be made. The protruding portions 102c contact and support the engaging portion 101a of the release rod 101, and thereby the release rod 101 is retained by the support members 102.

Although Embodiment 1 adopts the configuration in which the release rod 101 is retained by the pair of support members 102, the manner of retaining the release rod 101 is not thus limited. Alternatively, a configuration in which the release rod 101 is retained by a single support member 102 may be adopted.

The swinging portion 102b of each support member 102 is plate-shaped, for example, and is configured such that a right end portion 102d and a left end portion 102d of the swinging portion 102b are in contact with retaining portions 110a of the outer case 110, which will be described below. Each end portion 102d is formed such that its side surface at the center side in the front-rear direction (i.e., the inner side surface) is arc-shaped, such that the center of the arc coincides with a rotational (swinging) center C of the support member 102 (see FIG. 3). The support members 102 each swing about the rotational center C, such that the inner side surfaces of the end portions 102d swing downward and the outer side surfaces of the end portions 102d swing upward, thereby releasing the release rod 101.

It should be noted that the rotational center C of each support member 102 is positioned outward in the front-rear direction from a part of the protruding portion 102c where a load is transmitted from the release rod 101 to the protruding portion 102c (i.e., a part of the protruding portion 102c, the part being fit in the engaging portion 101a of the release rod 101).

In Embodiment 1, the swinging portions 102b of the support members 102 are arc-shaped, which allows each support member 102 to swing about the rotational center C. However, the configuration of the support members 102 is not thus limited. For example, an alternative configuration may be adopted, in which the support members 102 are pivotally supported by a shaft of the outer case 110, and thereby the support members 102 are made swingable.

The lower surfaces of the swinging portions 102b of the support members 102 are provided with recesses 102e, which are formed in the lower surfaces at suitable positions (specifically, at positions opposite to recesses 103b of the inner case 103, which will be described below) (see FIG. 4). To be more specific, each recess 102e is formed such that the center of the recess 102e in the front-rear direction is positioned outward in the front-rear direction from the rotational center C of the support member 102. Upper portions of elastic members 106, which will be described below, are fitted in the recesses 102e, respectively.

As shown in FIG. 1 to FIG. 5, the inner case 103 is formed in the shape of, for example, a rectangular parallelepiped, and is made of a metal such as aluminum. A fitting hole 103a with a shoulder portion is formed at the center of the upper surface of the inner case 103. The fitting hole 103a is formed such that the area of opening of the upper part of the fitting hole 103a is greater than the area of opening of the lower part of the fitting hole 103a. The lower inner peripheral surface of the fitting hole 103a is formed to have a shape that is consistent with the shape of the outer peripheral surfaces of the engageable portions 102a of the support members 102. Consequently, when the support members 102 are in the state of retaining the release rod 101, the engageable portions 102a are fitted in the lower part of the fitting hole 103a with substantially no gap.

The recesses 103b are formed in peripheral portions of the upper surface of the inner case 103. Lower portions of the elastic members 106 are fitted in the recesses 103b, respectively. The elastic members 106 are configured to space the inner case 103 and the support members 102 apart from each other in the central axis direction of the release rod 101 when the pair of support members 102 is in the state of being fitted in the fitting hole 103a of the inner case 103. Compression springs or the like may be used as the elastic members 106.

A pair of side surfaces of the inner case 103 that are opposite to each other (right and left side surfaces in FIG. 1) are provided with columnar protruding portions 103c, respectively. A frame member formed by a pair of first members 104 and a pair of second members 105 is disposed surrounding the inner case 103. Although Embodiment 1 adopts the configuration in which the frame member is formed by the pair of first members 104 and the pair of second members 105, the manner of forming the frame member is not thus limited. Alternatively, a configuration in which the frame member is realized by a single frame-like member may be adopted.

The pair of first members 104 is disposed along the pair of opposite side surfaces of the inner case 103 (the right and left side surfaces in FIG. 1). The pair of second members 105 is disposed along a pair of side surfaces that are opposite to each other in a direction perpendicular to the direction in which the first members 104 are opposite to each other (i.e., the pair of second members 105 is disposed along the front and rear side surfaces in FIG. 1), such that the second members 105 are opposite to each other.

Each first member 104 is plate-shaped and long in the front-rear direction, and its main surfaces face the right-left direction. Each first member 104 is made of a metal such as stainless steel. A through-hole 104a is formed through the center of the main surfaces of each first member 104 (at a third position or a fourth position). The protruding portions 103c of the inner case 103 are fitted in the through-holes 104a, respectively. This allows the first members 104 to swing relative to the inner case 103.

Embodiment 1 adopts the configuration in which the protruding portions 103c of the inner case 103 are fitted in the through-holes 104a of the first members 104, and thereby the inner case 103 is swingably supported. However, the manner of swingably supporting the inner case 103 is not thus limited. For example, an alternative configuration may be adopted, in which the first members 104 are provided with protruding portions, and the inner case 103 is provided with recesses or through-holes in which the protruding portions are fitted, which allows the first members 104 to pivotally support the inner case 103, and thereby the inner case 103 is swingably supported.

Both ends of each first member 104 are placed on the pair of respective second members 105. Each second member 105 is strip-shaped and long in the right-left direction, and its main surfaces face the front-rear direction. Each second member 105 is made of, for example, an insulating synthetic resin. The second members 105 are disposed such that they extend perpendicularly to the extending direction of the first members 104. A through-hole 105a is formed through the center of each second member 105 (at a first position or a second position) (see FIG. 4). The through-hole 105a has a tapered shape such that its area of opening at the inner main surface of the second member 105 is greater than the area of opening at the outer main surface of the second member 105.

A bolt 107 is inserted in the through-hole 105a of the second member 105, such that the head of the bolt 107 is positioned inside. The bolt 107, together with a nut 108, fixes one of the operation-enabling elements 111 and third members 109 to the second member 105.

Hereinafter, the operation-enabling elements 111 and the third members 109 are described in detail with reference to FIG. 7.

Figure 7:
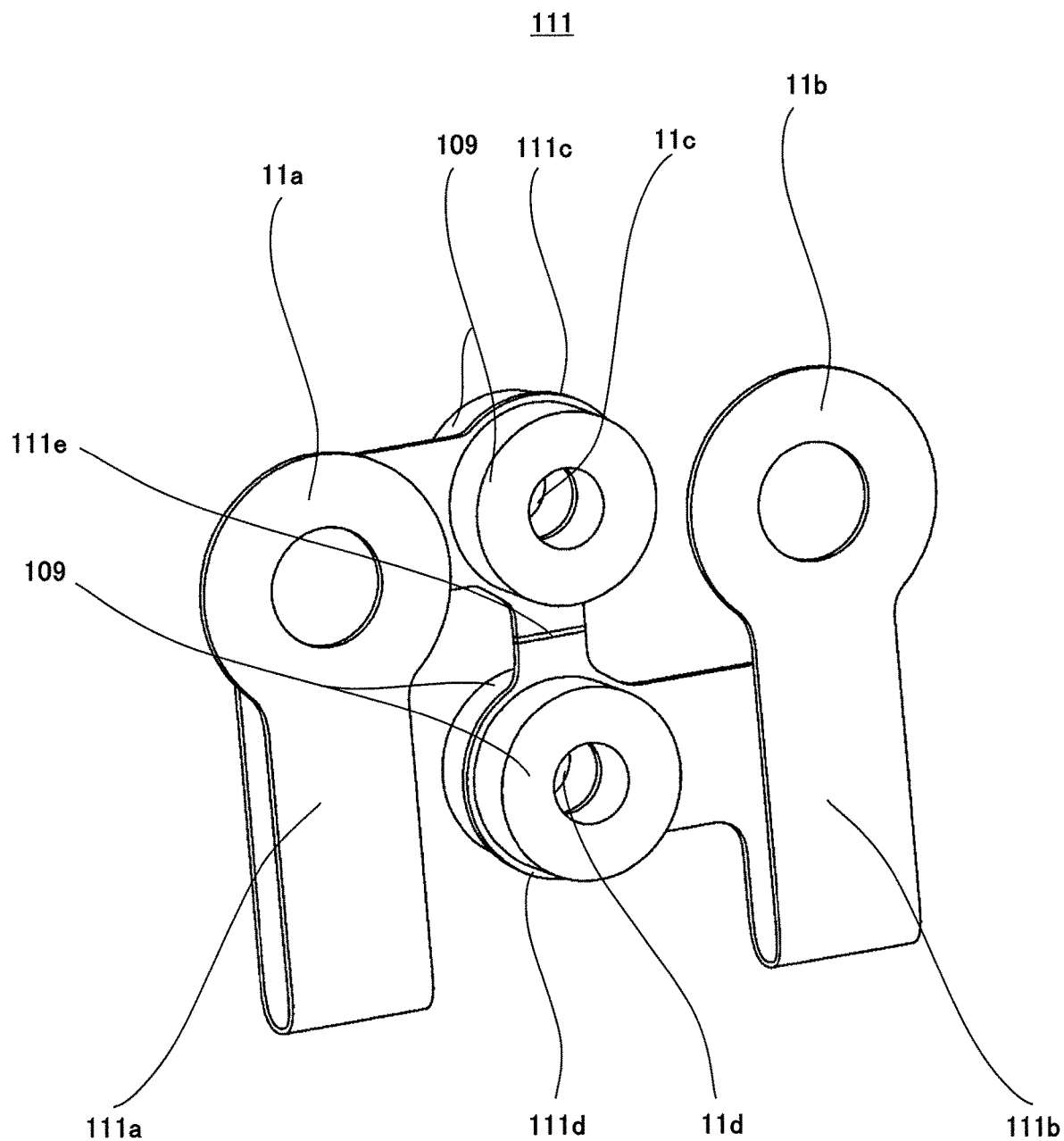
FIG. 7 is a schematic diagram showing a schematic configuration of an operation-enabling element and third members shown in FIG. 1.

FIG. 7 is a schematic diagram showing a schematic configuration of one of the operation-enabling elements and the third members shown in FIG. 1.

As shown in FIG. 7, the operation-enabling element 111 is formed by a strip-shaped metal foil. The operation-enabling element 111 includes: a lead portion 111a including a terminal 11a; a lead portion 111b including a terminal 11b; fixing portions 111c and 111d; and a fusion cutting portion 111e. A power supply circuit including switching elements is connected to each of the terminal 11a of the lead portion 111a and the terminal 11b of the lead portion 111b via suitable wiring (not shown).

The fixing portion 111c and the fixing portion 111d are positioned between the lead portion 111a and the lead portion 111b, and are provided with a through-hole 11c and a through-hole 11d, respectively, for inserting bolts therein. Annular third members 109 are disposed on both main surfaces of each of the fixing portion 111c and the fixing portion 111d. Each third member 109 is made of an insulating material (e.g., polyimide resin) whose thermal insulation capacity is higher than that of the metal (e.g., Ni-based amorphous alloy ribbon) forming the operation-enabling element 111.

It should be noted that the operation-enabling element 111, the second member 105, and the third members 109 may be integrally formed by insert molding or the like. The thermal conductivity of the third members 109 may be lower than that of the operation-enabling element 111. For example, the thermal conductivity of the third members 109 may be 0.1 to 0.4 W/m·k.

The fusion cutting portion 111e is formed such that its cross-sectional area is less than that of the other portions of the operation-enabling element 111. Specifically, the fusion cutting portion 111e is formed such that the length of the fusion cutting portion 111e in its width direction is less than that of the other portions of the operation-enabling element 111, and such that the length of the fusion cutting portion 111e in its thickness direction is also less than that of the other portions of the operation-enabling element 111.

As shown in FIG. 3 to FIG. 5, each operation-enabling element 111 is fixed to the outer case 110 by a bolt 112 and a nut 113. Specifically, the bolt 112 is inserted in a through-hole formed through the upper part of the front or back side surface of the outer case 110. The bolt 112 is also inserted in the through-hole 11c of the operation-enabling element 111 and the third members 109, and the operation-enabling element 111 and the third members 109 thus attached to the bolt 112 are fixed to the outer case 110 by the nut 113.

Moreover, as mentioned above, the operation-enabling element 111 is fixed to the second member 105. Specifically, the bolt 107 inserted in the through-hole 105a of the second member 105 is also inserted in the through-hole of the operation-enabling element 111 and the third members 109, and in this state, the nut 108 is fastened to the distal end of the bolt 107. Thus, the operation-enabling element 111 is disposed in a manner to support (bridge between) the second member 105 and the outer case 110. The inner case 103 is placed on the second members 105 via the first members 104. Therefore, it can be said that the operation-enabling elements 111 support the inner case 103 and the outer case 110 via the first members 104 and the second members 105.

Although Embodiment 1 adopts the configuration in which the operation-enabling elements 111 support the inner case 103 and the outer case 110 via the first members 104 and the second members 105, the manner of supporting the inner case 103 and the outer case 110 by the operation-enabling elements 111 is not thus limited. An alternative configuration in which the operation-enabling elements 111 directly support the inner case 103 and the outer case 110 may be adopted.

The outer case 110 is box-shaped. A through-hole is formed through the center of the upper surface of the outer case 110, and also, a through-hole is formed through the center of the lower surface of the outer case 110. A shoulder portion is formed on the upper part of each of the right and left sides of the outer case 110. These shoulder portions serve as the retaining portions 110a, which are contacted by the swinging portions of the support members.

[Operations and Functional Advantages of Separation Device]

Next, operations and functional advantages of the separation device 100 according to Embodiment 1 are described with reference to FIG. 1 to FIG. 10.

First, a state where the separation device 100 retains a cosmonautic vehicle is described with reference to FIG. 1 to FIG. 7.

As described above, a cosmonautic vehicle such as an artificial satellite is connected to the release rod 101 via a bolt (not shown), and the release rod 101 is accommodated in the inner case 103 in a state where the release rod 101 is retained by the pair of support members 102.

Specifically, the support members 102 retain the release rod 101 in such a manner that the engageable portions 102a of the pair of support members 102 sandwich the engaging portion 101a of the release rod 101. At the time, the protruding portions 102c of the engageable portions 102a are engaged with the engaging portion 101a, and thereby the release rod 101 is retained.

In the state where the pair of support members 102 retains the release rod 101, these members are fitted in the fitting hole 103a of the inner case 103. To be more specific, the support members 102 are fitted in the fitting hole 103a, such that the outer peripheral surfaces of the engageable portions 102a of the support members 102 are in contact with the inner peripheral surface of the fitting hole 103a of the inner case 103.

As shown in FIG. 4, the elastic members 106 are disposed between the inner case 103 and the support members 102. Specifically, the elastic members 106 are disposed in the recesses 103b of the inner case 103 and the recesses 102e of the support members 102.

When accommodated in the inner case 103, the support members 102 are positioned such that the end portions 102d are in contact with the retaining portions 110a of the outer case 110. Accordingly, as shown in FIG. 3, a load F1 from the cosmonautic vehicle, which is exerted on the release rod 101, is transmitted to the retaining portions 110a of the outer case 110 via the end portions 102d of the support members 102.

Specifically, the load F1 is transmitted as a load F2, which is substantially in the central axis direction, to each of the protruding portions 102c of the pair of support members 102, which fit in the engaging portion 101a of the release rod 101. Most of the load F2 received by each of the protruding portions 102c is transmitted as a load F3, which is in the central axis direction, to each of the retaining portions 110a of the outer case 110, which are in contact with the end portions 102d of the support members 102.

Accordingly, the load F1 from the cosmonautic vehicle, which is exerted on the release rod 101, is not transmitted to the operation-enabling elements 111. This makes it possible to reduce the strength of the operation-enabling elements 111, thereby making it possible to reduce electric power that is applied for fusion-cutting the operation-enabling elements 111. In addition, a time required for the fusion cutting of the operation-enabling elements 111 can be reduced, which makes it possible to separate the cosmonautic vehicle at a desired timing. Specifically, in the case of using the aforementioned Ni-based amorphous alloy ribbon, the strength and electrical resistivity of the operation-enabling elements may be 180 to 250 N and 1.4 to $1.8 \times 10^{-6} \Omega \cdot m$, respectively. In this case, by applying an electric current of about 8 A to the operation-enabling elements, the separation device can be caused to operate in about 0.2 seconds.

A load F4 shown in FIG. 3 is small component force of the load F2 received by each protruding portion 102c. The load F4 is exerted in a direction perpendicular to the inner peripheral surface of the fitting hole 103a of the inner case 103, and generates a torque that is exerted in such a direction as to open the support members 102. The load F4 is not transmitted to the operation-enabling elements 111.

It should be noted that the load F4 can be determined based on, for example, the ratio between the following horizontal direction distance and vertical direction distance: the horizontal direction distance is a distance in the horizontal direction from the rotational center C of the support member 102 to the load center of the load F2 (hereinafter, "horizontal direction distance H"); and the vertical direction distance is a distance in the vertical direction from the rotational center C of the support member 102 to a part of the inner case 103, the part receiving the load F4 (hereinafter, "vertical direction distance P"). By increasing the vertical direction distance P relative to the horizontal direction distance H, the load F4 can be reduced.

As mentioned above, the elastic members 106 press the inner case 103 and the support members 102 such that the inner case 103 and the support members 102 are spaced apart from each other in the central axis direction of the release rod 101. The elastic members 106 are configured such that a load F5 pressing the inner case 103 the support members 102 is greater than friction force that is exerted between the inner case 103 and the support members 102. The friction force is caused by the load F4, which is horizontally exerted on the inner case 103.

The load F5 is transmitted to the operation-enabling elements 111. As mentioned above, by increasing the vertical direction distance P, the load F4 can be reduced, and thereby the friction force can be reduced, which makes it possible to reduce the load F5 of the elastic members 106. Accordingly, by increasing the vertical direction distance P, the strength of the operation-enabling elements 111, which are required to have sufficient strength against the load F5, can be reduced.

As shown in FIG. 5, the first members 104 are swingably attached to the protruding portions 103c of the inner case 103. Each first member 104 is placed on end portions of the second members 105 in a manner to straddle the pair of second members 105. The second members 105 are suspended from the outer case 110 by the operation-enabling elements 111. It should be noted that, as described above, no load from the cosmonautic vehicle is transmitted to the operation-enabling elements 111 via the first members 104, the inner case 103, and the release rod 101.

Next, operations through which the separation device 100 separates the cosmonautic vehicle are described with reference to FIG. 1 to FIG. 10.

Figure 8:
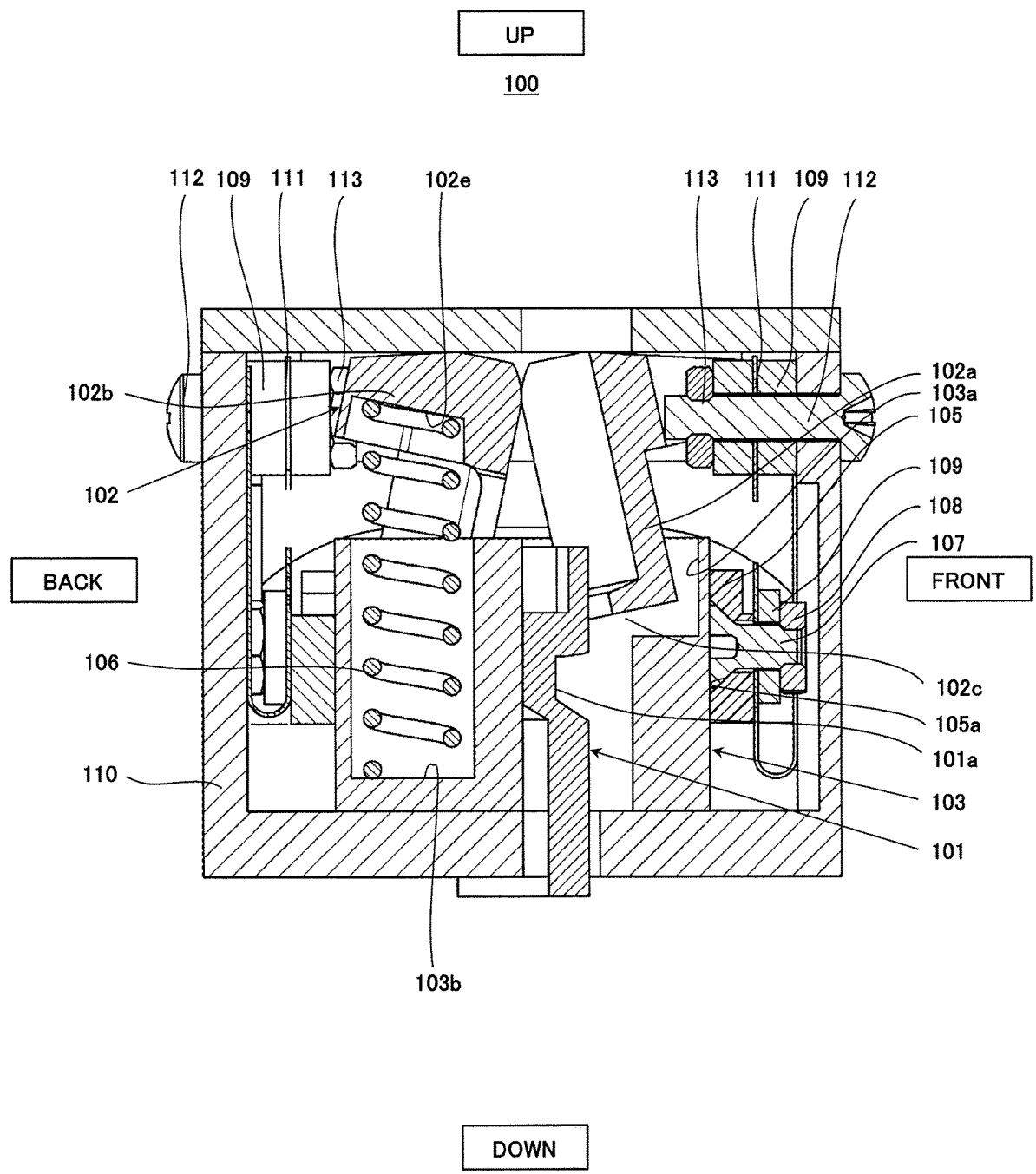
FIG. 8 is a sectional view taken along the line A-A' of FIG. 2, and is a schematic diagram showing a state where the separation device has operated.
Figure 9:
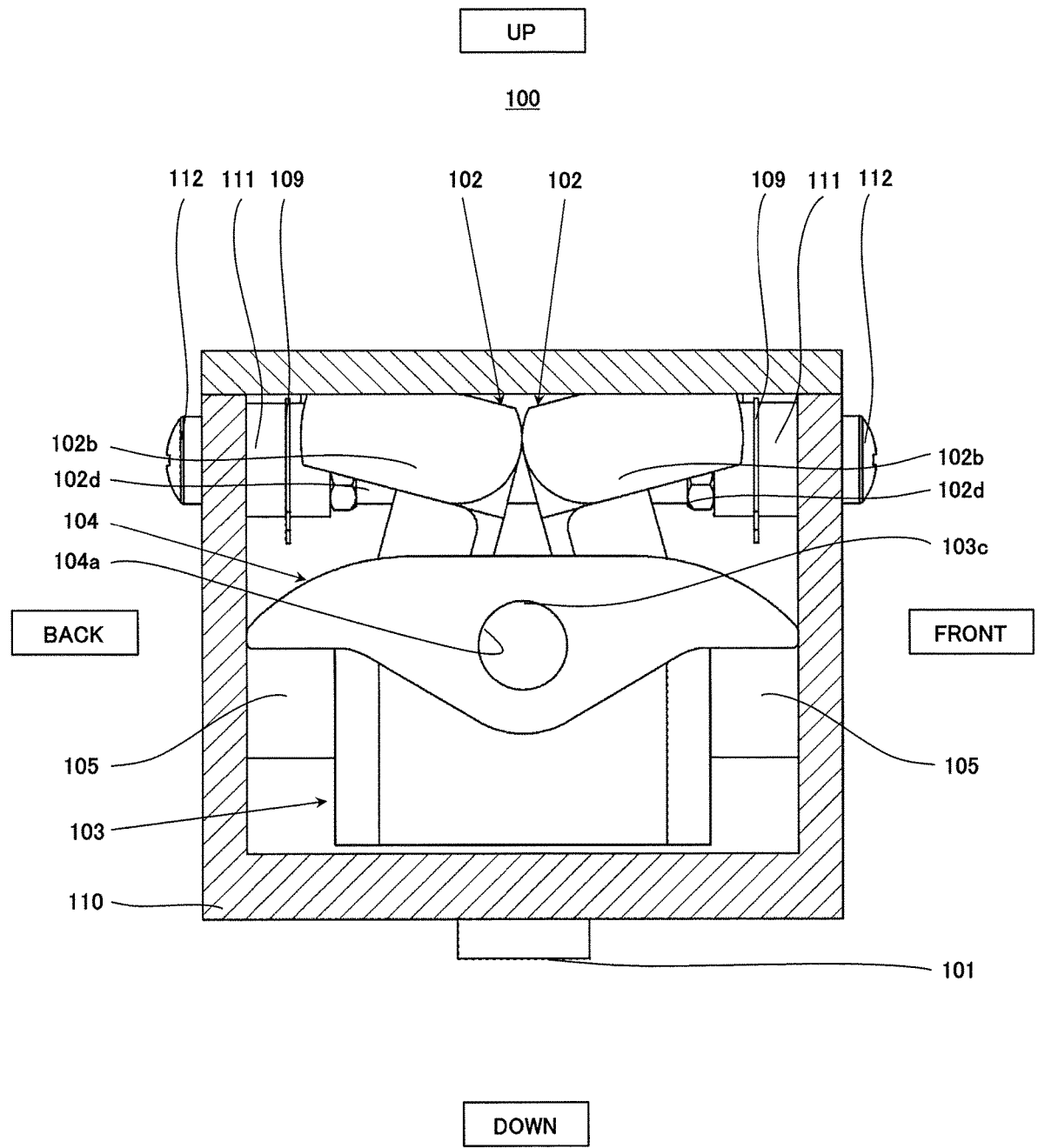
FIG. 9 is a sectional view taken along the line B-B of FIG. 2, and is a schematic diagram showing a state where the separation device has operated.
Figure 10:
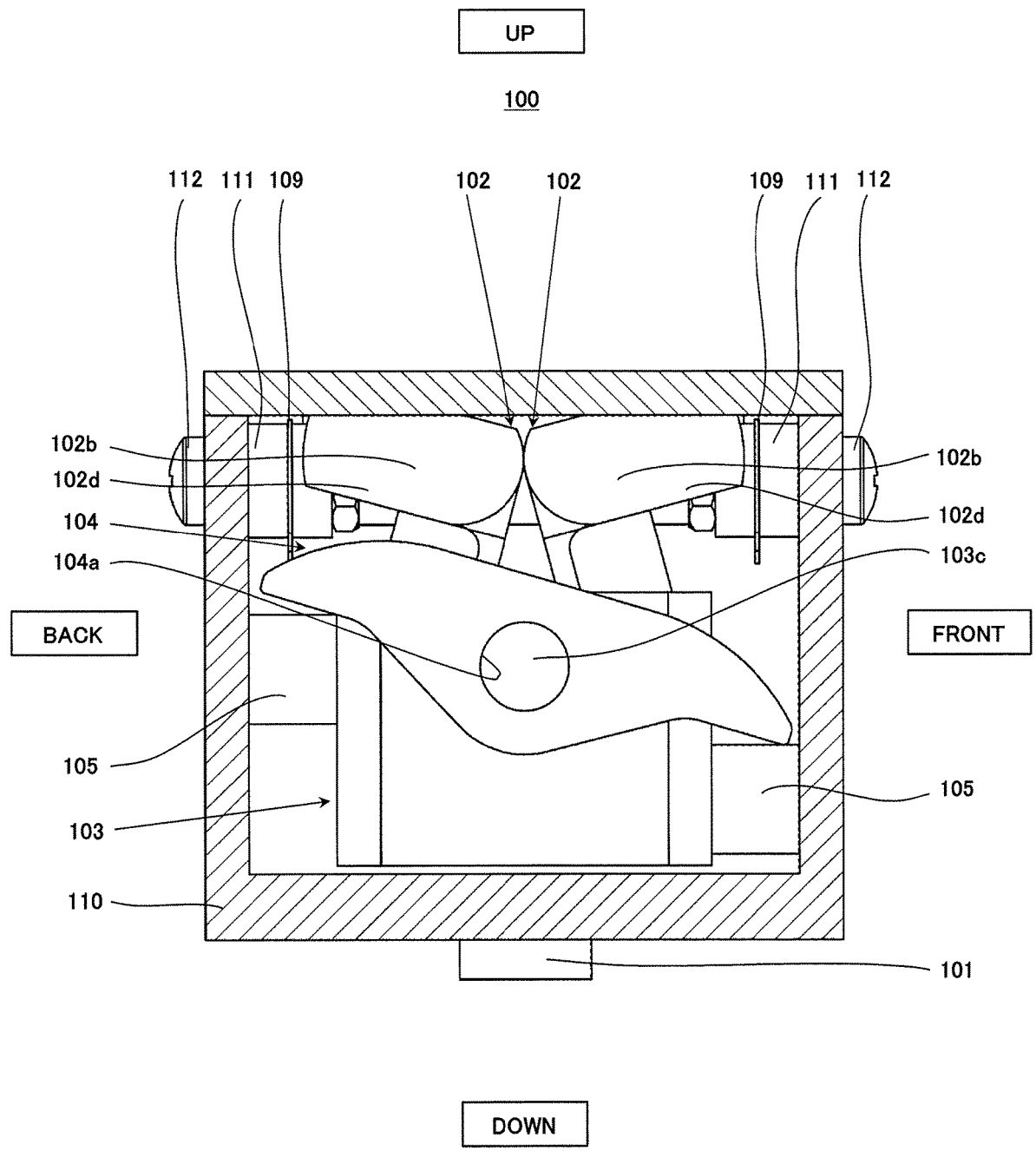
FIG. 10 is a sectional view taken along the line B-B of FIG. 2, and is a schematic diagram showing a state where the separation device has operated.

FIG. 8 is a sectional view of the separation device shown in FIG. 2, the view being taken along the line A-A' of FIG. 2 and showing a state where the separation device has operated. FIG. 9 and FIG. 10 are sectional views of the separation device shown in FIG. 2, each view being taken along the line B-B of FIG. 2 and showing a state where the separation device has operated. It should be noted that FIG. 9 is a schematic diagram showing a state where the two operation-enabling elements 111 have been both fusion-cut as a result of applying an electric current thereto, and FIG. 10 is a schematic diagram showing a state where one of the two operation-enabling elements 111 has been fusion-cut as a result of applying an electric current thereto.

First, a control signal is outputted from a controller (not shown) to the power supply circuit, and the power supply circuit supplies electric power to the operation-enabling elements 111. As a result of applying an electric current to the operation-enabling elements 111, the fusion cutting portions 111e of the operation-enabling elements 111 are fusion-cut. Consequently, the inner case 103 moves downward in the central axis direction due to the weight of, for example, the inner case 103 itself and/or the pressing force of the elastic members 106.

At the time, as shown in FIG. 9, when the two operation-enabling elements 111 are both fusion-cut as a result of applying an electric current thereto, the first members 104 move downward together with the inner case 103 while keeping their horizontal orientation. On the other hand, as shown in FIG. 10, when only one of the two operation-enabling elements 111 is fusion-cut as a result of applying an electric current thereto, the first members 104 become inclined such that the end portions thereof at the side at which the operation-enabling element 111 has been fusion-cut (in FIG. 10, the end portions at the front side) are lowered. In accordance with the inclination, the inner case 103 moves downward.

As described above, in Embodiment 1, the second members 105 are suspended from the respective operation-enabling elements 111, and the first members 104 are placed on the end portions of the second members 105, such that each first member 104 straddles the pair of second members 105. Accordingly, when at least one of the two operation-enabling elements 111 is fusion-cut, the separation device 100 operates. That is, electrical redundancy is achieved.

When the inner case 103 moves downward, the engageable portions 102a of the support members 102 are released. Specifically, when the inner case 103 moves downward, the engageable portions 102a of the support members 102 move within the fitting hole 103a from the lower part of the hole having a smaller area of opening to the upper part of the hole having a larger area of opening.

As a result, each support member 102 swings about the rotational center C, such that the inner side surfaces of the end portions 102d face downward and the outer side surfaces of the end portions 102d face upward. Consequently, the release rod 101 moves downward, and thereby the release rod 101 and the cosmonautic vehicle connected to the release rod 101 are released.

As described above, according to the separation device 100 of Embodiment 1, the release rod 101 can be retained and released with a simple configuration. This makes it possible to readily manufacture the separation device 100 and lower the manufacturing cost.

The load of the cosmonautic vehicle fixed to the release rod 101 is transmitted to the retaining portions 110a of the outer case 110, but not to the operation-enabling elements 111. Therefore, the strength of the operation-enabling elements 111 can be reduced, which makes it possible to reduce the amount of electric power necessary for fusion-cutting the operation-enabling elements 111.

Embodiment 2

[Configuration of Separation Device]

Figure 11:
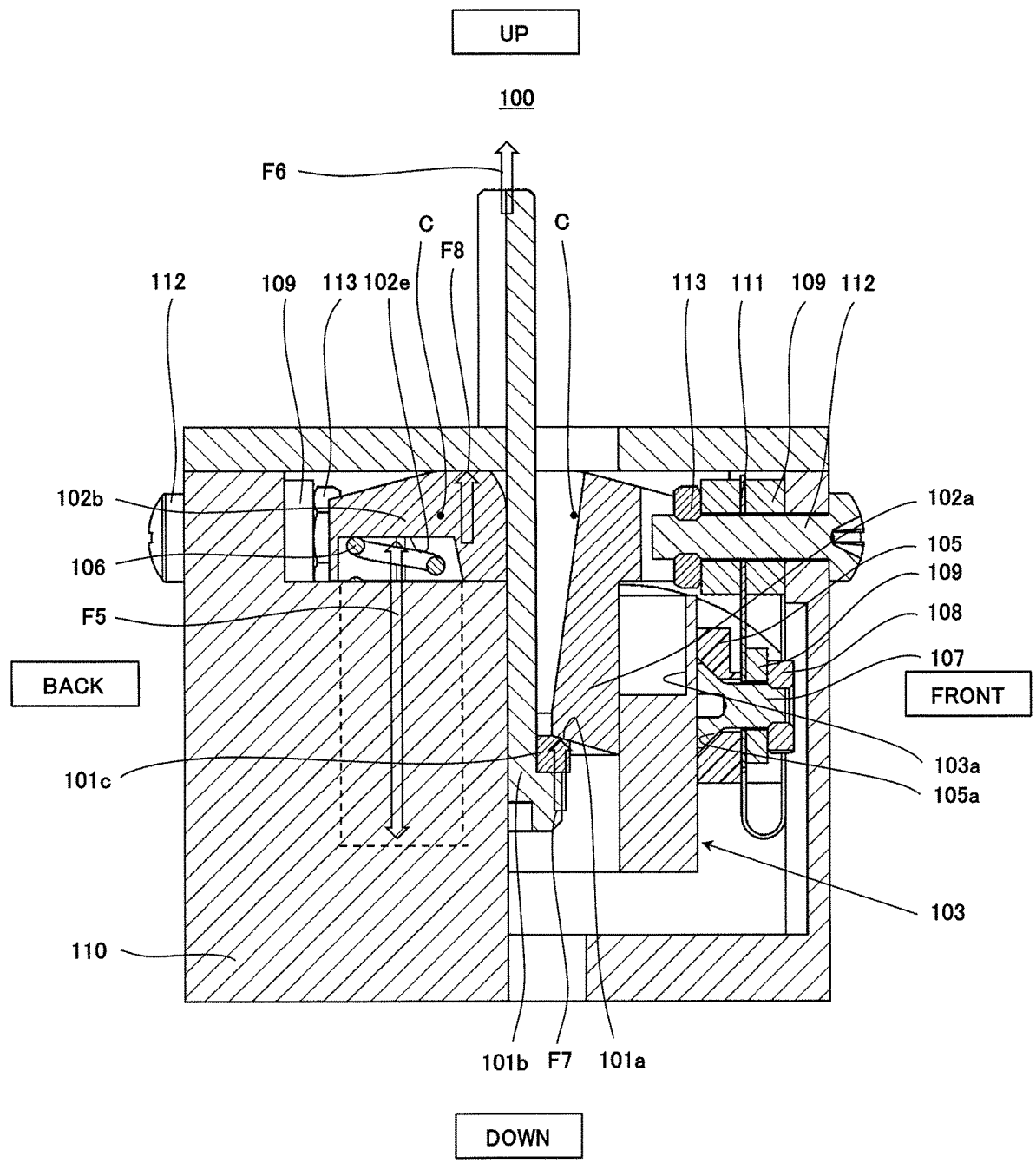
FIG. 11 is a schematic diagram showing a schematic configuration of a separation device according to Embodiment 2.
Figure 12:
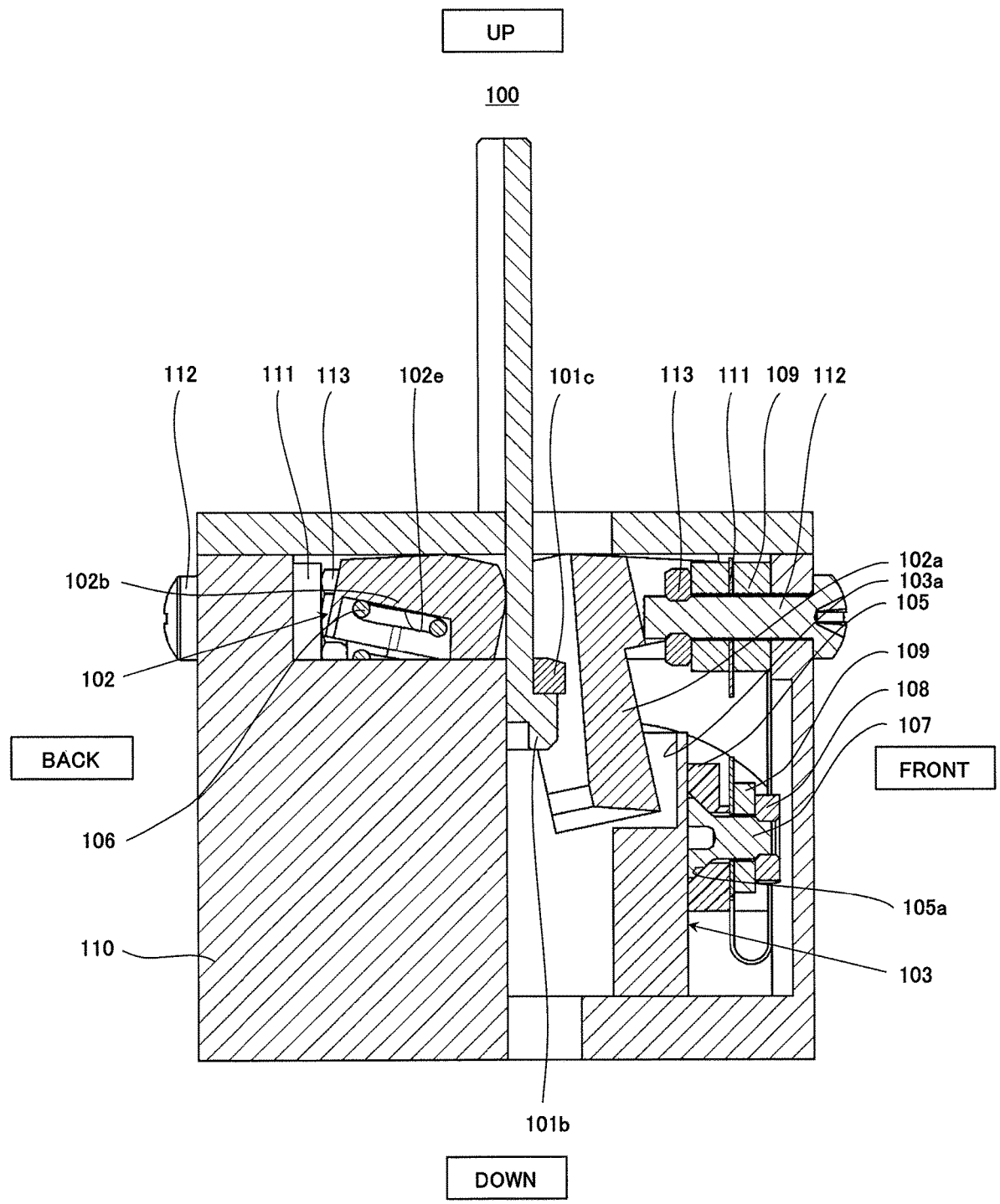
FIG. 12 is a schematic diagram showing a schematic configuration of the separation device according to Embodiment 2.

FIG. 11 and FIG. 12 are schematic diagrams each showing a schematic configuration of a separation device according to Embodiment 2. FIG. 11 shows the separation device before operating, whereas FIG. 12 shows the separation device that has operated.

As shown in FIG. 11 and FIG. 12, the fundamental configuration of the separation device 100 according to Embodiment 2 is the same as that of the separation device 100 according to Embodiment 1. However, the separation device 100 according to Embodiment 2 is different from the separation device 100 according to Embodiment 1 in that, in the separation device 100 according to Embodiment 2, a bolt 101b and a spherical washer 101c are used as separation members instead of the release rod 101, and also, the shape of the support members 102 is different.

Specifically, the bolt 101b is disposed such that the head thereof is positioned downward, and the distal end of the shaft is positioned upward. The shaft of the bolt 101b is inserted in the spherical washer 101c. The upper surface of the spherical washer 101c is a spherical protruding surface, and the lower surface of the spherical washer 101c is a flat surface. The upper surface of the spherical washer 101c serves as the engaging portion 101a, which engages with (contacts) the support members 102.

Before the separation device 100 operates, when the support members 102 are seen from above, the area of an opening formed by the inner peripheral surfaces of the engageable portions 102a decreases downward. In other words, the inner peripheral surfaces of the engageable portions 102a are inclined such that, when seen horizontally (in the front-rear or right-left direction), the upper portions of the inner peripheral surfaces are positioned outward from the lower portions of the inner peripheral surfaces. This makes it possible to form a space that is sufficient for the bolt 101b and the spherical washer 101c to pass through the inside of the support members 102 when the separation device has operated.

The lower surfaces of the support members 102 are recessed upward. In Embodiment 2, each support member 102 is configured such that the inner-peripheral-surface-side end portion of the lower surface engages with (contacts) the upper surface of the spherical washer 101c.

The separation device 100 according to Embodiment 2 with the above-described configuration provides the same functional advantages as those provided by the separation device 100 according to Embodiment 1.

In the separation device 100 according to Embodiment 2, mass-produced goods such as the bolt 101b are used as the separation members. This makes it possible to lower the manufacturing cost as compared to the separation device 100 according to Embodiment 1.

In the separation device 100 according to Embodiment 2, the upper surface of the spherical washer 101c has a protruding shape, and the lower surface of each support member 102 has a recessed shape. Accordingly, even when the bolt 101b is inclined, the engagement (contact) between the upper surface of the spherical washer 101c and the lower surfaces of the support members 102c can be kept sufficiently. This makes it possible to sufficiently reduce the possibility of unintended removal of the bolt 101b from the support members 102 even if external stress is applied to the bolt 101b.

As shown in FIG. 11, in the separation device 100 according to Embodiment 2, the bolt 101b is disposed such that the distal end of the shaft is positioned upward. Accordingly, the cosmonautic vehicle such as an artificial satellite is disposed such that the cosmonautic vehicle is positioned over the separation device 100. Therefore, a load F6 from the cosmonautic vehicle, which is exerted on the bolt 101b, is an upward load. The load F6 is exerted in such a direction as to press the support members 102 on the ceiling surface of the outer case 110 via the upper surface of the spherical washer 101c, i.e., exerted in a manner to press the support members 102 upward (load F7).

As mentioned above, the elastic members 106 press the inner case 103 and the support members 102, such that the inner case 103 and the support members 102 are spaced apart from each other in the central axis direction of the bolt 101b. Accordingly, the support members 102 are pressed by the elastic members 106 on the ceiling surface of the outer case 110. That is, the support members 102 are pressed upward by the load F5 of the elastic members 106.

Therefore, even when the load F6 from the cosmonautic vehicle is exerted on the bolt 101b, the state where the support members 102 are pressed on the ceiling surface of the outer case 110 is kept, and the support members 102 do not move in the up-down direction. As a result, the load F6 is not transmitted to the operation-enabling elements 111, and even when the load F6 from the cosmonautic vehicle is exerted on the bolt 101b, the operation-enabling elements 111 will not be cut.

Therefore, the strength of the operation-enabling elements 111 can be reduced, and the amount of electric power necessary for fusion-cutting the operation-enabling elements 111 can be reduced.

Although the above-described separation device 100 according to Embodiment 1 adopts the configuration in which the release rod 101 is used as the separation member, the separation device 100 according to Embodiment 1 is not thus limited. Alternatively, the separation device 100 according to Embodiment 1 may adopt a configuration in which the bolt 101b and the spherical washer 101c are used as separation members as in the separation device 100 according to Embodiment 2.

Similarly, although the above-described separation device 100 according to Embodiment 2 adopts the configuration in which the bolt 101b and the spherical washer 101c are used as the separation members, the separation device 100 according to Embodiment 2 is not thus limited. Alternatively, the separation device 100 according to Embodiment 2 may adopt a configuration in which the release rod 101 is used as a separation member as in the separation device 100 according to Embodiment 1.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

INDUSTRIAL APPLICABILITY

The separation device according to the present invention is useful since it makes it possible to: retain and release the separation member with a simple configuration; increase the ease of manufacturing of the separation device; and lower the manufacturing cost.

REFERENCE SIGNS LIST 11a terminal
11b terminal
11c through-hole
11d through-hole
100 separation device
101 release rod
101a engaging portion
102 support member
102a engageable portion
102b swinging portion
102c protruding portion
102d end portion
102e recess
103 inner case
103a fitting hole
103b recess
103c protruding portion
104 first member
104a through-hole
105 second member
105a through-hole
106 elastic member
107 bolt
108 nut
109 third member
110 outer case
110a retaining portion
111 operation-enabling element
111a lead portion
111b lead portion
111c fixing portion
111d fixing portion
111e fusion cutting portion
112 bolt
113 nut

The invention claimed is:

1. A separation device comprising:
an outer case;
a separation member accommodated in the outer case and including one of: (i) a protruding portion that protrudes in a radial direction or (ii) a recessed portion that is recessed in the radial direction, the separation member receiving a load exerted in a central axis direction;
a support member including a swinging portion and an engageable portion, the swinging portion being swingably supported by the outer case, the engageable portion contacting the one of the protruding portion or the recessed portion to support the separation member;
an inner case including a fitting hole in which the engageable portion is fitted, the fitting hole restricting swinging of the support member; and
an operation-enabling element that supports the inner case in the outer case and that is fusion-cut when an electric current is applied thereto, wherein
when the operation-enabling element is fusion-cut, the inner case is displaced in the central axis direction, such that:
the engageable portion of the support member detaches from the fitting hole;
the swinging portion swings; and
the engageable portion moves away from the one of the protruding portion or the recessed portion to release the separation member.

2. The separation device according to claim 1, wherein the operation-enabling element is made of a material having a tensile strength of 2000 to 3000 MPa and an electrical resistivity of 1 to $10 \times 10^{-6} \Omega \cdot m$.

3. The separation device according to claim 1, wherein an elastic member is disposed between the inner case and the support member, the elastic member pressing the inner case and the support member such that the inner case and the support member are spaced apart from each other in the central axis direction.

4. The separation device according to claim 1, further comprising:
a frame member disposed in a manner to surround the inner case when seen in the central axis direction, wherein
the operation-enabling element is a first operation-enabling element, and the separation device further comprises a second operation-enabling element,
the frame member is suspended from the outer case via the first operation-enabling element at a first position and a second operation-enabling element at a second position, the first and second positions being opposite to each other with the inner case positioned therebetween, and
the frame member supports the inner case at a third position and a fourth position such that the inner case is swingable, the third and fourth positions being opposite to each other in a direction perpendicular to a direction in which the first and second positions are opposite to each other.

5. The separation device according to claim 4, wherein the frame member includes a pair of plate-shaped first members and a pair of plate-shaped second members, which are swingably disposed on the inner case such that the first members are opposite to each other and the second members are opposite to each other,
the second members are suspended from the outer case via the operation-enabling elements, and
both ends of each of the first members are placed on the pair of respective second members.

6. The separation device according to claim 1, wherein the engageable portion of the support member includes:
a semi-cylindrical portion surrounding at least part of the separation member; and
an arc-shaped flange portion protruding inward from an inner surface of the semi-cylindrical portion and contacting the one of the protruding portion or the recessed portion of the separation member, wherein
notches are formed at ends of an inner peripheral surface of the flange portion.

7. The separation device according to claim 1, wherein the operation-enabling element includes a fusion cutting portion whose cross-sectional area is less than that of other portions of the operation-enabling element.

8. The separation device according to claim 7, wherein a third member having a higher thermal insulation capacity than that of the operation-enabling element is disposed near the fusion cutting portion of the operation-enabling element.

9. The separation device according to claim 1, wherein the separation member is a rod.

* * * * *